United States Patent
Humburg

[11] Patent Number: 5,660,329
[45] Date of Patent: Aug. 26, 1997

[54] VEHICLE HEATER WITH WATER PUMP VENTING

[75] Inventor: Michael Humburg, Göppingen, Germany

[73] Assignee: J. Eberspächer GmbH & Co., Esslingen, Germany

[21] Appl. No.: 612,856

[22] PCT Filed: Dec. 27, 1994

[86] PCT No.: PCT/EP94/04310

§ 371 Date: Feb. 26, 1996

§ 102(e) Date: Feb. 26, 1996

[87] PCT Pub. No.: WO95/18337

PCT Pub. Date: Jul. 6, 1995

[30] Foreign Application Priority Data

Dec. 31, 1993 [DE] Germany .................. 43 45 054.7

[51] Int. Cl.⁶ .................................................. B60H 1/06
[52] U.S. Cl. ........................ 237/12.3 B; 415/169.1
[58] Field of Search ............ 237/12.3 B; 415/169.1; 96/103

[56] References Cited

U.S. PATENT DOCUMENTS 2,710,664  6/1955  Blackmore et al. ............ 415/169.1
4,734,019  3/1988  Eberhardt ...................... 415/169.1
5,584,650  12/1996  Redmond et al. ............. 415/169.1

FOREIGN PATENT DOCUMENTS 331922    2/1989  European Pat. Off. .
41 00 523 7/1991  Germany .
422524    4/1964  Switzerland .
735866    8/1955  United Kingdom .
2197029   5/1988  United Kingdom .

*Primary Examiner*—William E. Tapolcai
*Attorney, Agent, or Firm*—McGlew and Tuttle

[57] ABSTRACT

In a vehicle heating appliance, water is pumped as heat transfer medium through a heat exchanger that surrounds the combustion chamber. The water pump is mounted above the heat exchanger and pumps the water it axially receives into the heat exchanger through a tangential pump outlet pipe. To vent the pump, a connection hole with a small cross-section is provided in the top area of the pump part of the water pump. The connection hole leads to the system flow pipe. Any air bubbles accumulated in the pump chamber of the pump part reach the flow pipe through the connection hole, propelled by their own ascending force and helped by the geometric arrangement of the pump chamber and return pipe, including the connection hole, and/or additionally by the pressure difference between the pump chamber and the return pipe.

6 Claims, 1 Drawing Sheet

VEHICLE HEATER WITH WATER PUMP VENTING

FIELD OF THE INVENTION

The present invention pertains to a vehicle heater with a combustion chamber, which is surrounded by a heat exchanger, through which water or water with added antifreeze flows as the heat carrier. A water pump arranged outside on the heat exchanger pumps water, from a return pipe of a water circuit, through the heat exchanger. The water leaves the heat exchanger via a flow pipe after heating. Such vehicle heaters are usually used as auxiliary heaters in passenger cars, trucks, and buses, and also in recreational vehicles, small motorboats, construction equipment, and airplanes.

BACKGROUND OF THE INVENTION

A fuel-air mixture is generated in the combustion chamber by means of a fuel pump, a combustion air blower, and, e.g., a fuel evaporator. During the combustion of the mixture, the thermal energy is released by a heat exchanger surrounding the combustion chamber to the heat carrier, which is part of a heat carrier circuit.

Vehicle heaters should have a very compact design and meet a high standard in terms of operating safety.

One special problem related to the usual vehicle heaters is the bleeding of the pump circulating the heat carrier, e.g., water, in the heat carrier circuit, Air originating from the filling of the heat carrier circuit must be prevented from collecting or remaining within the pump chamber of the pump part, not only to avoid undesired noises during the operation, but especially to guarantee the desired throughput of the pump. The pump can be driven electrically by a pump motor.

In the usual vehicle heaters, the water pump has hitherto been arranged under the heat exchanger and consequently practically in the deepest area of the entire water circuit. The consequence of this was that air bubbles that may be present in the area of the pump automatically rose up, so that they did not cause any interference at a higher point of the water circuit. In view of the problem of the generation of air bubbles in the pump area, the water pumps were hitherto intentionally arranged under or next to the heat exchanger in order to guarantee the escape of the air bubbles due to this special installation position.

SUMMARY AND OBJECT OF THE INVENTION

The basic object of the present invention is to provide a vehicle heater of the class described in the introduction, in which the water pump can be arranged not only next to the heat exchanger, but also above it, without the risk of air bubbles collecting or remaining in the pump.

This object is accomplished according to the present invention in a vehicle heater of the above-described class by the delivery side of the pump part of the water pump being connected in terms of flow via a connection opening of small diameter to the flow pipe of the water circuit.

The term "flow pipe" is related here to the entire heating system, so that the "flow pipe" feeds the water just heated by the heat exchanger to the system having one or more heating heat exchangers (heating elements). The "return pipe" is correspondingly the pipe which feeds the water cooled, due to heating the surrounding environment by the heating element, to the heat exchanger for reheating.

Thus, the present invention creates a "bypass" between the delivery side of the pump and the pipe via which the water just heated leaves the heat exchanger. The pressure occurring in this "flow pipe" is somewhat lower than in the pump chamber (the water has flown through the heat exchanger, e.g., along a spiral path), and over a section of the flow pipe between the pump chamber and the junction point of the small connection opening in the flow pipe).

Any air bubbles that may be present in the area of the pump are forced by the pressure occurring there into the flow pipe because of the above-mentioned differences in pressure, and they enter the system via the flow pipe at a point that is remote from the water pump.

This removal of possible air bubbles operates especially reliably if the flow pipe is located higher than the pump part of the water pump, and the connection opening is at the highest point of the pump chamber of the pump part in the installed position of the water pump. It is achieved due to this measure that air bubbles that may be present will collect in the vicinity of the connection opening even in the state of rest of the water pump, because water bubbles present in the pump chamber will rise up and collect at the connection opening (unless they have already entered the flow pipe through the connection opening without the pump running), since the connection opening is located at the highest point of the pump chamber.

If the connection opening between the pump chamber and the flow pipe is placed at the highest point of the pump chamber, in which case the flow pipe is located even higher than the connection opening, it is possible to install the water pump on top of the heat exchanger of the vehicle heater. If the water pump is not only to be placed on top of the heat exchanger, but it shall also be desired to arrange the pump next to the heat exchanger, this becomes possible according to the present invention by providing—in the installed position of the water pump—a pocket at the highest point of the pump chamber of the pump part, which point is also the laterally outermost point of the pump chamber, and by providing the connection opening at the highest and laterally outermost point of the pocket.

It can be imagined that in such a design, the air bubbles migrate to the "highest" point of the pump chamber, i.e., to the pocket, and finally to the connection opening if the water pump is located on the top of the heat exchanger. If the water pump is arranged laterally next to the heat exchanger, in which case the water outlet connection piece of the pump extends horizontally, any air bubbles that may be present will also reliably reach the connection opening, through which they can enter the flow pipe.

The connection opening preferably has a cross section of 0.5–3 $mm^2$. As was stated, the connection opening according to the present invention is a "bypass." The water flow passing through the connection opening represents a loss of circulation per se, because the water is not yet heated and yet enters the flow pipe of the system. However, the "leakage loss" is extremely small in the case of such a small cross-sectional area as indicated above, so that any reduction in the efficiency of the system is negligible.

It is obvious that the problems being discussed here are specific of water pumps which are used in vehicle heaters. The medium being pumped is usually fed in in the axial direction in the water pumps being discussed here, and it is pressed out by the pump impeller in the radial direction, and the discharge from the pump chamber is arranged tangentially.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
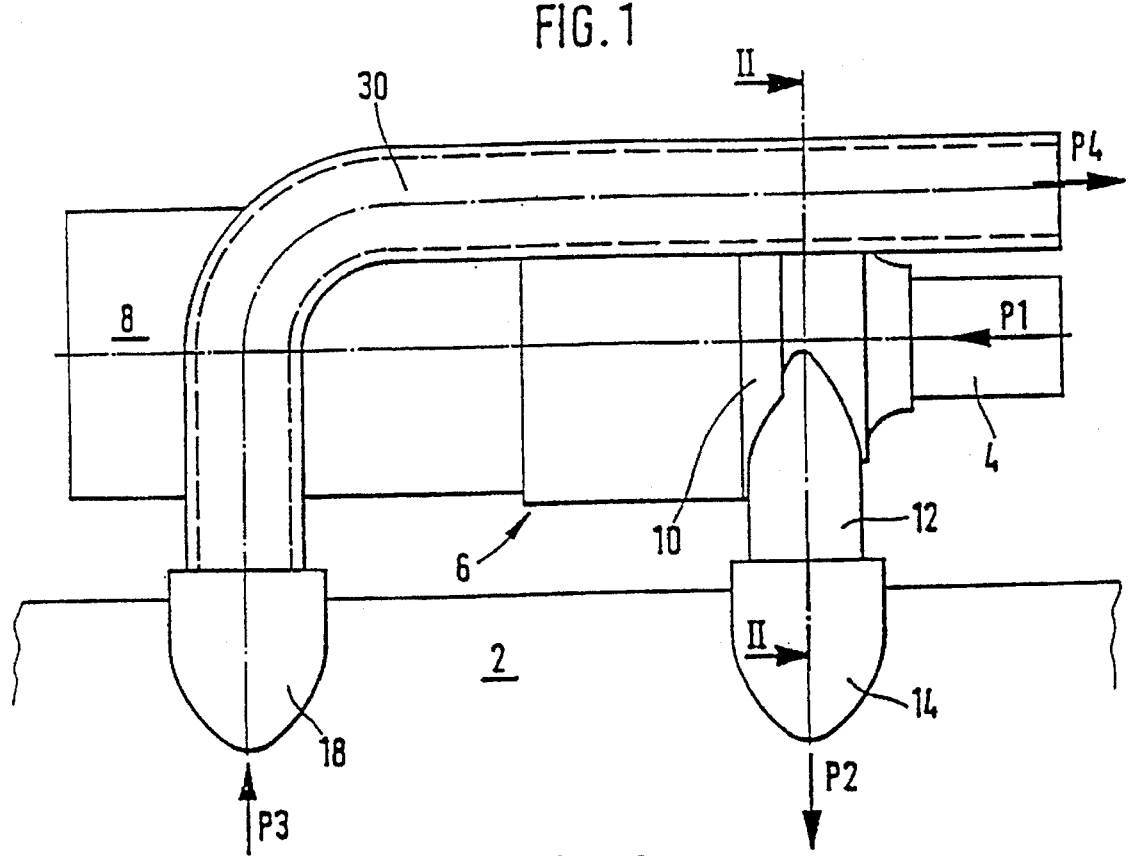
FIG. 1 is a side view of a water pump with an inlet and an outlet and with a pipe originating from the heat exchanger, wherein the water pump is arranged on top of a partially represented heat exchanger of a vehicle heater.

FIG. 1 shows part of a prior-art heat exchanger 2 of a vehicle heater. The other parts of the vehicle heater are not shown here, because they are not essential to the present invention. However, the person skilled in the art knows that a combustion air blower, a fuel pump, a control device, and the water pump 6 shown in FIG. 1 also belong to the vehicle heater, besides the heat exchanger 2 and the combustion chamber provided therein.

The water pump 6 has an electric pump motor 8 with electric terminals not shown here, and a pump part 10, to which relatively cold water is fed axially via a system return pipe 4 in the direction of arrow P1. The water pump 6 is of a prior-art design and it does not need to be discussed here in greater detail. A pump impeller (which was omitted in FIG. 2 for simplicity's sake) is located in a pump chamber 38 (FIG. 2) of the pump part 10. The pump impeller receives the water flowing in axially to a low pressure side of the pump and delivers the water from a high pressure side radially to the outside, so that the water is discharged via a tangentially arranged pump discharge connection piece 12.

Figure 2:
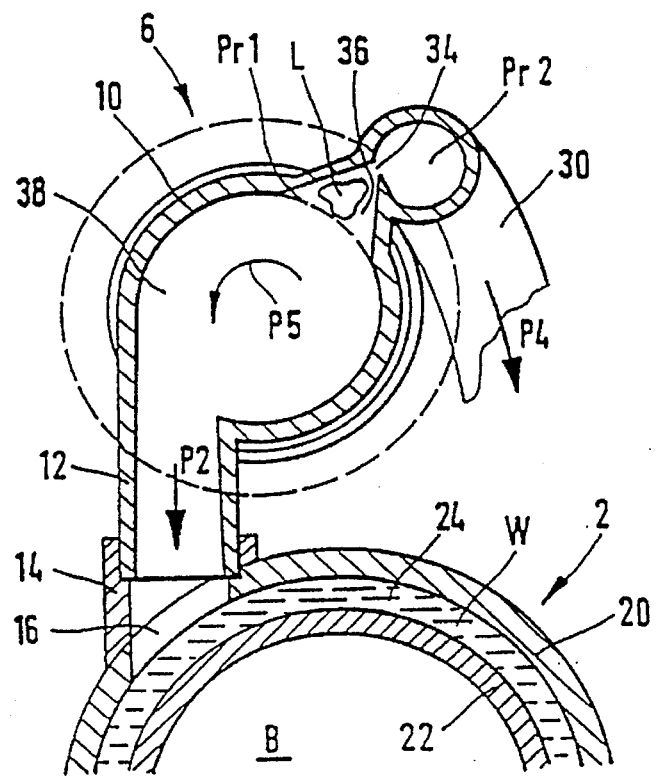
FIG. 2 is a sectional view along line II—II in FIG. 1.

As is also apparent from FIG. 1 and FIG. 2, the water leaving the pump part 10 via the pump discharge connection piece or end 12 (arrow P2 in FIG. 2) enters the heat exchanger 2 through a pipe connection or intake end 14 and a hole 16.

As is shown in the bottom part of FIG. 2, the heat exchanger 2 has an outer jacket 20 and an inner jacket 22, between which an annular space or flow passage 24 is formed, and through which water W flows. The combustion chamber B is located inside the heat exchanger 2. The thermal energy present in the combustion chamber B due to the flame reaches the water W acting as a heat carrier via the inner jacket 22.

Guide ribs are usually formed within the annular space 24. These guide ribs guide the water along the cylinder jacket-shaped annular space 24 in a spiral pattern before the now heated water, leaves the heat exchanger 2 via a pipe connection or discharge end 18 to flow into a system flow or heat exchanger discharge pipe 30 (arrows P3 and P4 in FIG. 1). The flow pipe 30 feeds the warm water to one or more heating heat exchangers (heating elements).

To prevent air bubbles, which could considerably interfere with the operation, from collecting in the area of the pump part 10, a bleeding means is provided according to the present invention, which makes it possible to arrange the water pump 6 at any desired point, especially on top of the heat exchanger 2 or to the side of the heat exchanger 2.

FIG. 1 shows the water pump in its installed position on top of the heat exchanger 2. As is apparent from FIG. 2, the flow pipe 30 has a portion which is located at a higher point than the pump chamber 38 of the pump part 10 in the section plane of the pump part 10. A pocket 36 is provided in a connection part between the flow pipe 30 and the pump part 10 in the top right corner of the pump part 10.

A connection gap 34 is provided as a connection opening between the pump chamber 38 and the flow pipe 30 at the top right end of the pocket 36. The cross-sectional area of the connection gap 34 is 2 mm$^2$ in this exemplary embodiment.

The pump impeller (not shown) in the pump part 10 rotates in the direction of arrow P5 during operation in order to allow the water fed axially into the pump part to flow into the annular space 24 of the heat exchanger 2 in the tangential direction via the pump discharge connection piece 12 in the direction of arrow P2.

If air bubbles are formed or are present in the area of the pump, they migrate upward, especially with the pump not running, and they automatically reach the pocket 36. An air bubble L is shown as an example in the area of the pocket 36 in FIG. 2. Since there is a pressure gradient between the pump chamber 38 and the interior of the flow pipe 30, the air bubble L is pressed into the flow pipe 30, via which it will then be able to escape into the system in the upward direction. Only the uplift of the air bubble L acts when the pump is not running, as a consequence of which the air bubble L escapes into the flow pipe 30 because of the geometry shown in FIG. 2. During the operation of the pump, the air bubble L is expelled from the pocket 36 through the connection gap 34 because of the above-mentioned pressure gradient between the relatively high pressure Pr1 within the pocket 36 and the relatively low pressure P2 within the flow pipe 30.

Because of the special design of the pocket 36 shown in FIG. 2 at the highest point of the pump part 10 and also at the outermost point to the right of the pump part 10, the pump thus designed or the connection between the pump part and the flow pipe can be arranged not only according to FIG. 1, i.e., above the heat exchanger 2, but also to the side of the heat exchanger. It is guaranteed even in this position next to the heat exchanger that any air bubble can enter the flow pipe 30 and can escape into the system. This becomes dear on rotating FIG. 2 by 90° counterclockwise. The water pump 6 is located in this case on the left-hand side of the heat exchanger 2, and the connection gap 34 is located, as before, at the point that is located higher than the other areas of the pump chamber 38, but still below the flow pipe 30.

The arrangement shown in FIG. 2 can also be designed mirror-inverted, i.e., the pump discharge connection piece 12 may be located on the right-hand side in FIG. 2, while the pocket 36 and the connection gap 34 are in the top left area of FIG. 2.

The pocket 36 described may be essentially as long as the pump chamber 38 in the axial direction (i.e., at right angles to the plane of the drawing in FIG. 2). However, the pocket 36 is preferably made very flat, i.e., 0.5 to 3 mm in length, in the axial direction. It will thus preferably be located at the axial end of the pump chamber 38 which is farther above in the case of sloped or vertical installation (angle of the axis of the heat exchanger relative to the horizontal direction) of the vehicle heater. In FIG. 1 this would be the right-hand axial end of the pump chamber in FIG. 1, i.e., the end that is farthest away from the point of fuel supply to the combustion chamber.

While specific embodiments of the invention have been shown and described in detail to illustrate the application of the principles of the invention, it will be understood that the invention may be embodied otherwise without departing from such principles.

I claim:

1. A vehicle heater comprising:

a heating circuit;

a combustion chamber positioned in said heating circuit;

a heat exchanger positioned in said heating circuit and around said combustion chamber, said heat exchanger including a flow passage, said flow passage having an intake end and a discharge end;

heat exchanger discharge pipe positioned in said heating circuit and connected to said discharge end of said heat exchanger;

pump means positioned in said heating circuit and for flowing a fluid through said heating circuit, said pump means including a high pressure side in communication with said intake end of said heat exchanger, said high pressure side of said pump means also includes a connection gap providing fluid communication between said high pressure side and a portion of said heat exchanger discharge pipe.

2. A vehicle heater in accordance with claim 1, wherein:

said portion of said heat exchanger discharge pipe is positioned higher said pump means;

said pump means includes a pump chamber;

said connection gap is positioned in a highest point of said pump chamber when said pump means is in an installed position.

3. A vehicle heater in accordance with claim 1, wherein:

said pump means includes a pump chamber;

said pump means defines a pocket positioned in a highest and outermost lateral point of said pump chamber;

said connection gap is positioned in a highest point of said pocket.

4. A vehicle heater in accordance with claim 1, wherein:

said connection gap an a narrowest flow cross section of 0.5 to 3 mm$^2$.

5. A vehicle heater in accordance with claim 1, further comprising:

a return pipe connected to a low pressure side of said pump means, said return pipe delivering water from another heat exchanger;

said pump means being positioned between said return pipe and said intake end of said heat exchanger.

6. A vehicle heater in accordance with claim 1, wherein:

a heat carrier flows though said heating circuit, said connection gap has a narrowest flow cross section of a size large enough for passage of gas bubbles in said heat carrier, said narrowest flow cross section is also of a size small enough to restrict heat carrier flow through said connection gap to a magnitude where any inefficiencies caused by said heat carrier flow though said connection gap is more than compensated by efficiencies gained by removing said gas bubbles.

* * * * *